(12) United States Patent
Graf et al.

(10) Patent No.: US 6,349,300 B1
(45) Date of Patent: Feb. 19, 2002

(54) METHOD AND SYSTEM FOR SELECTING PRODUCT COLORS

(75) Inventors: John Frederick Graf; Bernhard Joseph Scholz, both of Ballston Lake, NY (US); Jeffrey James Davis, Hudson, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/292,917

(22) Filed: Apr. 16, 1999

(51) Int. Cl.[7] .................. G06F 17/30; G06F 717/00
(52) U.S. Cl. ................. 707/100; 707/3; 707/4; 707/5
(58) Field of Search ...................... 707/100, 1–6, 707/102, 500, 526–528; 345/431–439, 425–430, 112–116, 131–133, 147, 501; 382/162, 167; 205/26, 27

(56) References Cited

U.S. PATENT DOCUMENTS 5,870,771 A * 2/1999 Oberg ...................... 707/502
6,052,669 A * 4/2000 Smith et al. ................ 705/26
6,125,352 A * 9/2000 Franklin et al. ............. 705/26
6,128,600 A * 10/2000 Imamura et al. ............ 705/27
6,177,093 B1 * 1/2001 Lombardi et al. .......... 424/401

* cited by examiner

Primary Examiner—Hosain T. Alam
Assistant Examiner—Alford W. Kindred
(74) Attorney, Agent, or Firm—David C. Goldman; Jill M. Breedlove

(57) ABSTRACT

The present invention is directed to a process for facilitating a purchaser's selection of a color for a product. In one embodiment, a purchaser is able to interact with a library of available colors for a product over a digital communication network, such as the Internet. The purchaser is able to browse the color library to identify a color of interest. Additionally, the purchaser is able to compare a color of interest to the available colors in the library to assess whether an available color for the product is close enough to the color of interest. Further, the purchaser can order chips or plaques of the available colors identified during a session so that a comparison of the color of interest to actual color samples of the product can be made before an order is placed.

51 Claims, 5 Drawing Sheets

FIG. 4

Search | Browse | Options | Order

Order List:

5 items

[Order list table showing:
GE 54967
GE 53712
GE 54951
GE 57235
GE 55202] — 52

Item Information:

GE Identification: #55202

Product: Cycolac

[Delete from Order]

[Place Order] — 49

Shipping Address:

Name: Joe Smith
Position: Designer
Division: US
Company: JSDesign, Inc.
Shipping Address: 123 Main St City: Big City
State/Province: NewState
Postal Code: 7654
Country: US

[Change Address]

Note: Changing your address will result in a 24 hour shipping delay due to address verification.

METHOD AND SYSTEM FOR SELECTING PRODUCT COLORS

BACKGROUND OF THE INVENTION

The present invention relates to color and, more specifically, to the selection of a color for a product.

Many products are offered in a number of colors. For instance, paints and plastics are offered in numerous colors. Potential purchasers of products that come in a number of different colors are either: (1) looking for the product in a specific color; or (2) want to browse the available colors for the product. Presently, a potential purchaser that is looking for a product in a specific color has three options for determining whether the product is available in the desired color. The first option requires the potential purchaser to send a sample of the desired color to the vendor. The vendor then performs a search of its color library to determine whether or not the product is available in the desired color and then informs the potential purchaser of the results of the search. The second option is for the potential purchaser to travel to the vendor's site and review their color library for a product to determine whether or not the vendor offers the product in the desired color. Lastly, the potential purchaser can request a physical copy of the vendor's color catalog for the product and search the catalog for the specific color. Due to printing costs and the like, physical copies of the vendor's catalog are, in many instances, out of date. In any case, the vendor may offer the product in a color that, while not the desired color, is close enough. Alternatively, if the product is not available in the desired color or a color that is close enough for the purchaser, some vendors offer to match the color. Matching a color is generally a time consuming and expensive endeavor. A purchaser that wants to browse the available colors for a product either travels to the vendor's site to peruse the vendor's color library for a product or obtains a copy of the vendor's color catalog for the product to review.

BRIEF SUMMARY OF THE INVENTION

Thus there is a particular need for a more efficient way for potential purchasers of products that are available in a number of colors, and especially in situations in which the product is available in a large number of colors, to select the color of the product. The present invention makes use of a computer network, such as the Internet, to convey information from a color database for a product to a potential consumer. This substantially reduces, if not eliminates, the need for a potential purchaser to either send a sample of the desired color to a vendor or to travel to the vendor's site to review a color library. To elaborate, the computer network is used to convey a request from a potential purchasers computer to a computer that has access to a color database for the product of interest. The request is capable of being related to either: (1) assessing the relationship of the desired color to the available colors for the product; or (2) browsing the color database. The computer network is subsequently used to convey a reply to the request. With respect to a request relating to assessing the relationship of the desired color to the available colors, the reply includes one or more of the available colors that are closest to the desired color. In the case of browsing, the reply facilitates the potential purchaser's review of the entire color database of available colors for the product.

BRIEF DESCRIPTION OF THE DRAWINGS

FIG. 4 shows one possible display on a potential purchasers color monitor of a form for ordering samples of colors of a product.

DETAILED DESCRIPTION OF THE INVENTION

Figure 1:
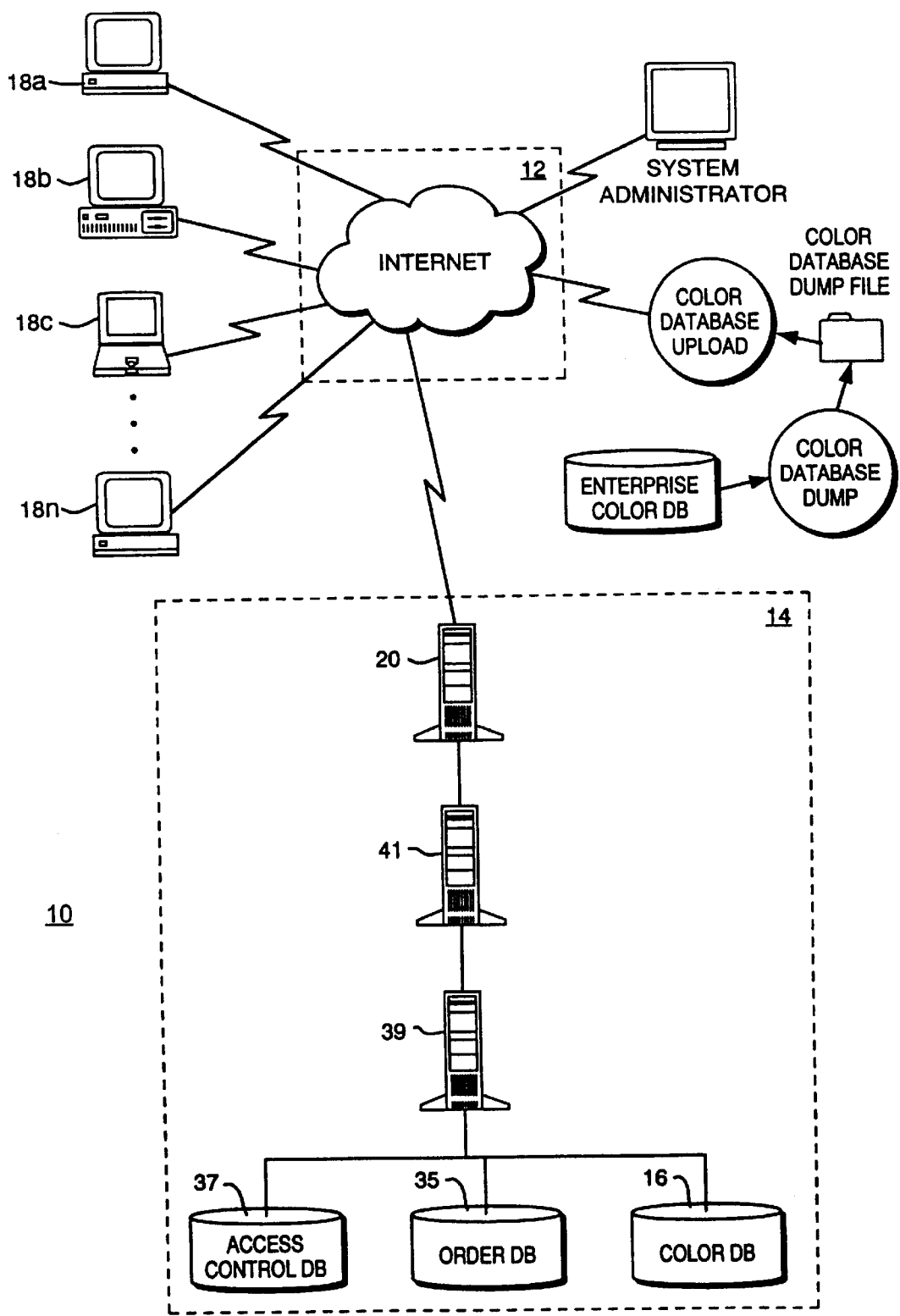
FIG. 1 is a diagram of a system capable of communicating information relating to the available colors for a product to a potential purchaser.

FIG. 1 illustrates a system 10 for providing color related information on a product to a potential purchaser of the product. The system 10 includes: (1) a digital communication network 12 for conveying digital information between at least two locations; (2) a host computer system 14 that includes a color database 16 for a product and is capable of providing color related information for transmission over the network 12; and (3) one or more potential purchaser computers 18A–18N that are each capable of generating requests relating to a color database for transmission over the network 12 and receiving replies from the host computer system 14 that have also been transmitted over the network 12.

In FIG. 1, the network 12 is the Internet and, more specifically, the World Wide Web portion of the Internet. Due to the use of the World Wide Web as the network 12, the potential purchaser computers 18A–18N and the host computer system 14 are each capable of communicating over the Web. In this regard, the potential purchaser computers 18A–18N are each devices that are capable of running a Web browser to communicate over the Web. For example, a potential purchaser's computer can be a personal computer or a Web TV. The host computer system 14 utilizes a Web server 20 to communicate with the potential customer computers 18A–18N. Even though the system 10 utilizes the Web as the network 12 for conveying communications between the host computer system 14 and the potential purchaser computers 18A–18N, it should be appreciated that the invention is capable of being adapted for use in other types of systems.

The host computer system 14 provides each of the potential purchaser computers with an interface that permits the potential purchaser to interact with the host computer system 14 via their computer. The interface includes an output portion and an input portion. The output portion conveys information from the host computer system 14 to a potential purchaser's computer and is typically displayed on the color monitor of the potential purchaser's computer. However, the output portion could be displayed on any output peripheral that is capable of generating colors. The input portion of the interface is used to convey information from the potential purchasers computer to the host computer system 14. Typically, the input information is generated by the potential purchaser's use of an input peripheral, such as a mouse or keyboard. In the illustrated embodiment, the interface is provided by Web pages that are transmitted from the host computer system 14 to a potential purchaser's computer. The Web pages display output information to the potential purchaser. In most cases, a portion of the display is used to solicit information from the potential purchaser by manipulating an input peripheral. For example, the potential purchaser may use their keyboard to input information into a field in the display or their mouse to click on a portion of the display, and thereby provide the host computer system 14 with information.

The interface provided to the potential purchaser's computer relates to either a search mode or a browse mode of operation. The search mode of operation permits a potential purchaser that knows the color that they desire for a particular product to determine if the vendor either has the product in the target color or a color that is close enough to the target color. The browse mode of operation permits a potential purchase who is uncertain of what color they want for a particular product to browse the available colors for the product.

Figure 2:
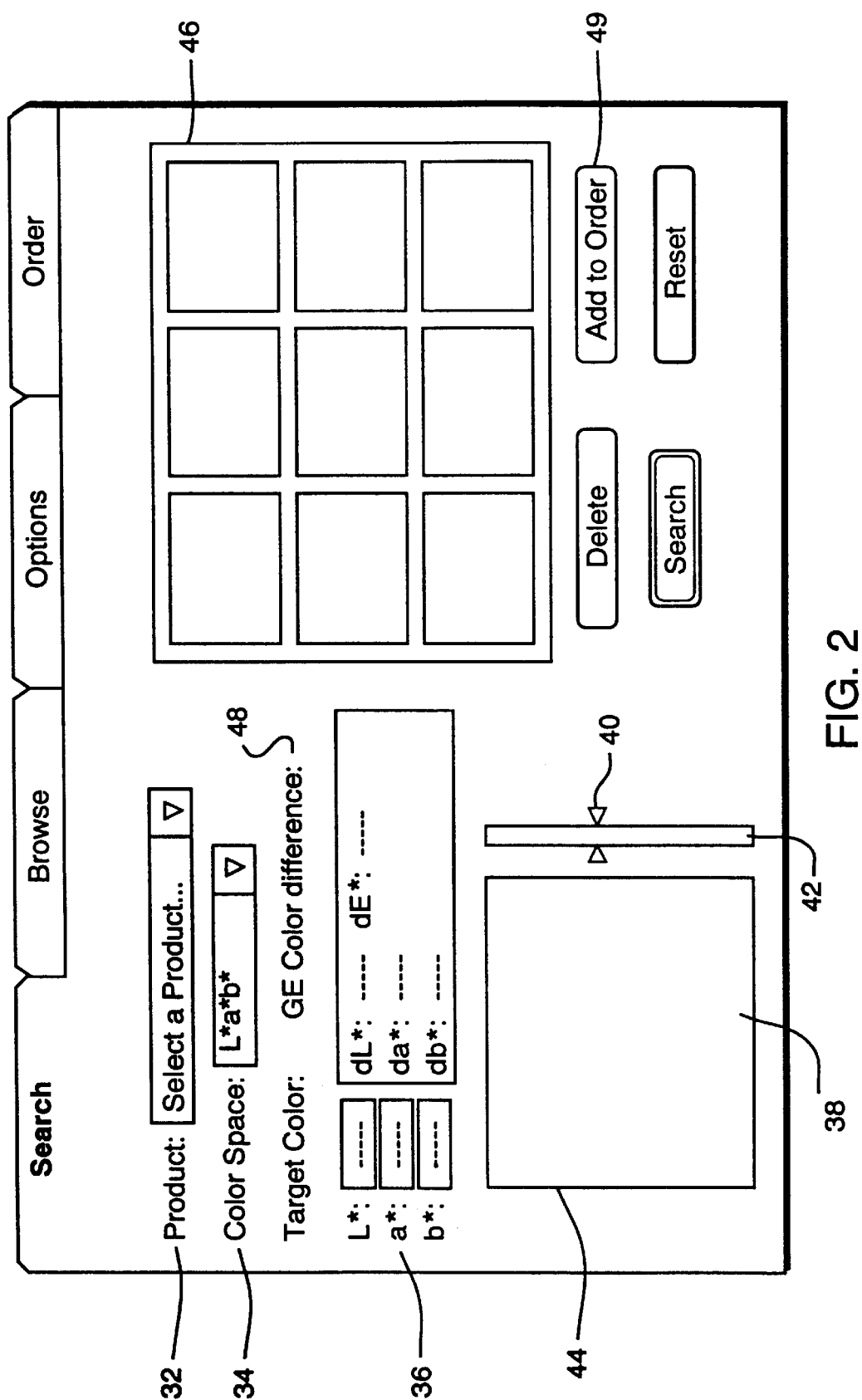
FIG. 2 shows one possible interface display on a potential purchaser's color monitor for permitting the potential purchaser to input a target color description to be used in the search mode of operation.

Regardless of the mode of operation, in many cases the vendor offers more than one product and each product is available in more than one color. For instance, a plastics vendor, could offer polycarbonate, ABS and polypropylene plastics, with each being available in a number of different colors. Consequently, in this case, the interface provided by the host computer system 14 to the potential purchaser's computer requires the potential customer to initially identify the product in which they are interested so that the host computer system 14 can access the appropriate color database. FIG. 2 illustrates one possible Web page that could be displayed on the monitor of a potential purchaser's computer and used by the potential purchaser to select the product of interest. The Web page includes a menu of products field 32 that permits the potential purchaser to select the product of interest. Typically, the potential purchaser uses a mouse to make the selection. However, it is also feasible to use other input devices to make a selection. In any event, once the selection has been made, the product selection information is conveyed over the network 12 to the host computer system 14.

In the search mode of operation, the potential purchaser specifies a target color for the product. The target color can be specified in a number of different ways. One way is the RGB method, which involves specifying a value for the red, green and blue components of the target color. Presently, values from 0–256 can be specified for each component. Another way to specify a color is by the L*a*b* method. In this case, values are specified for the "L*", "a*" and "b*" components of the target color. The "L*" component is the lightness/darkness of the target color; the "a*" component relates to the red/green aspect of the target color; and the "b*" component relates to the yellow/blue aspect of the target color. Presently, the "L*" component can have a value from 0 to 10, the "a*" component can have a value from –199 to +199; and the "b*" component can have a value from –199 to +199. Yet another way to specify a color is for the purchaser to select a color from a color display, either one or two dimensional, comprised of a number of color swatches. Associated with each tile is either a RGB or L*a*b* code.

To specify the target color, the potential purchaser's computer is provided with an interface that permits the potential purchaser to identify the target color. In the illustrated embodiment, the interface is a Web page that is provided by the host computer, conveyed over the network 12 and displayed on the monitor or other output device of the potential purchasers computer. FIG. 2 illustrates one possible Web page that could be displayed on the monitor of a potential purchaser's computer and used by the potential purchaser to input target color information to the host computer system 14. The potential purchaser is permitted to specify which color definition (RGB, L*a*b* or color display) is to be used in color space field 34. If either RGB or L*a*b* color definition scheme is selected, the potential purchaser specifies the value for each component of the target color in the target color values field 36. If the potential purchaser selects the color display, the target color is selected from a color display 38. To elaborate, the potential purchaser positions a bar 40 within a lightness field 42 to define the brightness of the target color. The user inputs or selects the hue of the target color from the color palette field 44 using a mouse or other appropriate input device. In any event, once the brightness and hue of the target color have been specified, the target color information is conveyed over the network 12 to the host computer system 14.

Once the host computer system 14 has received the target color information, a search of the color database 16 of available colors for the product commences. To facilitate the search of the database of available colors for a product, the search is conducted according to a single color identification system. In this case, the search initially may involve converting the target color data from one color identification system into the color identification system used in performing the search. In the illustrated embodiment, the search is conducted based on the L*a*b* system. Consequently, if the target color is specified according to the RGB system, it is converted to the L*a*b* system. This conversion is done according to a well known formula used in the television industry. After any conversion, the host computer system 14 operates to determine the "n" number of available colors for the product that are closest to the target color. In the illustrated embodiment, the number "n" is nine. However, this number can be changed if desired.

The determination of the "n" closest available colors is done by associating a tolerance with each of the values of the target color. For instance, the tolerance may be ±10 units. In essence, this defines a three dimensional space of color values. A search is then conducted of the database of available colors for the product for all the available colors that fall within the defined space. If the search identifies a number of available colors that exceeds the "n" value, the tolerance is halved to define a smaller three-dimensional space and the search is repeated. If a search identifies a number of available colors that is less than the "n" value, the tolerance is doubled to define a larger three-dimensional space and the search is repeated. Typically, the number "n" will be greater than the numbers of available colors identified in a search having first tolerance and less than the number of available colors identified in a search having a second tolerance that is twice the first tolerance, i.e. the next higher tolerance level. In this case, the "n" closest available colors from the search that produced "n" or more available colors are provided to the potential purchaser. While the search is shown as being conducted using the L*a*b* format, the search is capable of being adapted to the RGB format or any other multidimensional format for defining a color.

For each of the available colors that the host computer system 14 identifies as being closest to the target color, the host computer system 14 also determines the "closeness" of the available color to the target color. In the illustrated embodiment, the closeness (e) of an available color to the target color is determined by: (1) determining the differences (ΔL*, Δa* and Δb*) between the "L*", "a*" and "b*" components of the available color and the corresponding "L*", "a*" and "b*n" components of the target color; (2)

squaring the differences; and (3) summing the squares; and (4) taking the square root of the sums. This method of determining "closeness" is adaptable to the RGB format and any other multidimensional format for defining a color.

Figure 3:
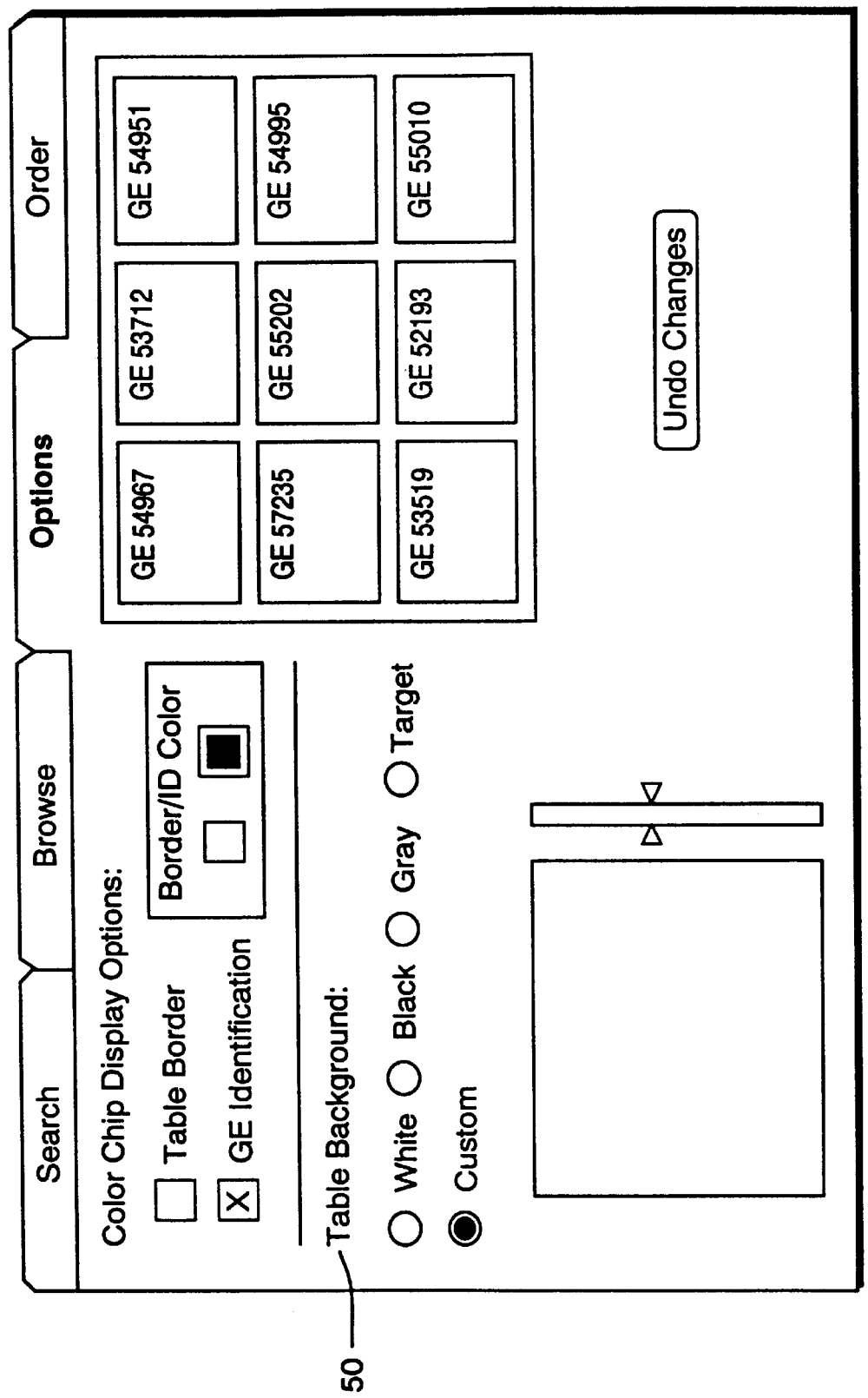
FIG. 3 shows one possible display on a potential purchaser's color monitor of an options menu that permits the potential purchaser to configure the viewing options, such as selecting the background color to be used in the "virtual color table" shown in FIG. 2.

Once the host computer system 14 has identified the available colors that are closest to the target color and the closeness of each of each of the available colors to the target color, this information is conveyed over the network 12 to the potential purchaser's computer for display on the color monitor or other output device associated with the potential purchasers computer. Typically, the information is conveyed in RGB format, which is color format used by most computers. In the illustrated embodiment, the information is conveyed in the form of a Web page that is displayed on the color monitor of the potential purchasers computer that is running a browser. The information is displayed as a "virtual color table" in which the default background color is the target color and the "n" closest available colors are swatches or tiles overlying the background color. The interface permits the potential purchaser to move or "drag" swatches around on the virtual color table. FIG. 2 includes an example of a virtual color table 46. Associated with each swatch in the virtual color table 46 is the closeness value calculated by the host computer. In FIG. 2, the closeness of a particular swatch to the target color is displayed in closeness field 48. The potential purchaser uses their mouse or other input device to pick the swatch in the virtual color table 46 for which they want a closeness value to be displayed in the field 48. Further, if needed, a vendor identification number can also be associated with each swatch. The interface also permits the potential purchaser to define a different background color. FIG. 3 illustrates an options Web page that permits the potential purchaser to define the background in a table background field 50.

At this point, the interface permits the potential purchaser to identify one or more of the available colors identified in the search as colors for which the potential purchaser would like actual samples to inspect. In the illustrated system, the potential purchaser uses a mouse or other input device to identify or "click on" the available color for which samples are desired. The color is typically identified by its vendor number. However, it is feasible to use a RGB, L*a*b* or other color identification number as the vendor number or translate such a number into a vendor number. In any event, this information is conveyed over the network 12 to the host computer system 14. In response, the host computer system 14 communicates the sample order to the appropriate individuals for processing. FIG. 4 illustrates an order Web page that permits the potential purchaser to order actual samples of the colors in an order list field 52. The colors in the order list field 52 are defined by using a mouse or other input device to: (1) identify a particular color in the virtual color table 46; and (2) then actuate an add to order button 49. As an alternative, or in addition to ordering samples, the interface permits the potential purchaser to also place an order for a quantity of product in an available color that either matches the target color or, based upon the potential purchaser's judgment, is close enough to the desired color.

The browse mode of operation permits a potential purchaser who is uncertain about the color that they want for a particular product to peruse the available colors for the product. If there are only a few available colors for a product, a one dimensional array of the available colors is conveyed from the host computer system 14 to the potential purchasers computer system over the network 12. The array is displayed on the potential purchaser's color monitor or other output device. In many cases, the number of available colors for a particular product is greater than can be meaningfully displayed in a single image on the potential purchaser's color monitor or other output device. In this situation, the potential purchaser is provided with an interface that includes an indexing tool. The indexing tool is a spectrum of colors that is transmitted from the host computer system 14 to the potential purchasers computer system for display on a color monitor. The potential purchaser is able to move a bar or other indicator within the spectrum by manipulating an input device, typically a mouse. The location of the bar relative to the displayed spectrum is conveyed over the network 12 to the host computer system 14. The location of the bar defines a color definition, such as a RGB or L*a*b* color definition. In response, the host computer system 14 determines which of the available colors are within a certain tolerance of the defined color, much like the previously described search operation, and transmits swatches of the available colors over the network 12 to the potential purchaser's computer for display on a color monitor or other output device.

Figure 5:
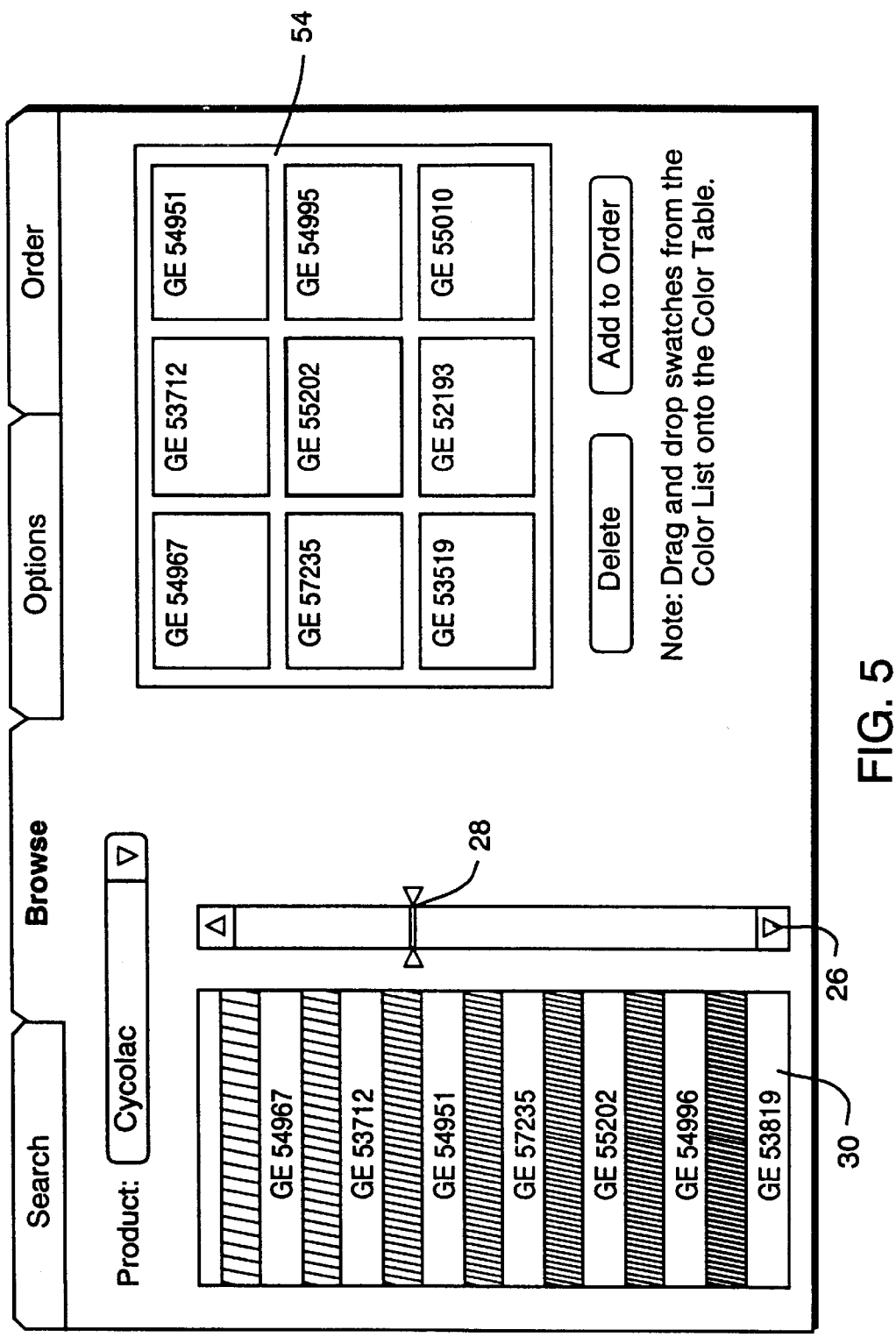
FIG. 5 shows one possible interface display on a potential purchaser's color monitor for permitting the potential purchaser to browse a color database for a product.

FIG. 5 illustrates one possible Web page that could be displayed on the potential purchaser's computer in a browse mode. The spectrum is one dimensional array and is displayed in a window 26 on the potential purchaser's color monitor. A bar 28 is located adjacent to the window 26 and can be moved back and forth along the length of the spectrum. The available colors for the product that are closest to the color in the spectrum indexed by the bar 28 are displayed in a one dimensional array in another window 30 on the potential purchaser's color monitor. Colors that are selected from the window 30 are displayed in a virtual color table 54 that is identical to the virtual color table 46 shown in FIG. 2. The Web page interface operates such that as the potential purchaser changes the position of the bar 28 relative to the spectrum in the first window 26, the host computer system 14 changes the available colors in the second window 30. Further, if a search was conducted before the browse mode was entered, the browse mode initially positions the bar at a point on the spectrum that roughly corresponds to the target color defined in the prior search mode.

At this point, the potential purchaser can select one or more of the colors from the virtual color table 54 as colors for which they would like to obtain actual samples to inspect. The ordering of samples proceeds in substantially the same manner as described with respect to the search mode.

The host computer system 14, in the illustrated embodiment, includes an order database 35, access control database 37, database server 39 and firewall 41. The database server processes requests relating to either the color database 16, order database 35 or access control database 37. The order database 35 is used to store sample orders made by a potential purchaser and/or product orders. The access control database 37 operates in conjunction with the firewall 41 to: (1) prevent unauthorized access to the host computer system 14; and (2) with respect to individuals/companies that are authorized access to the host computer system 14, enforce any limitations on the authorized access. For instance, a system administrator typically may have access to the entire system. Whereas, a potential purchaser would have their access limited to reading information from the color database 16 and placing orders for either samples or product.

The program run by the host computer system 14 to provide the interface and process requests from the potential purchaser's computer is written in HTML and JAVA so that it is platform independent. Queries of the databases are done in SQL. Other programs run by the host computer system provide for system administration, maintenance and the uploading of color information into the color database. The color information that is to be uploaded can reside in an off-site color database that is accessible via the network.

The foregoing description of the invention has been presented for purposes of illustration and description. Further, the description is not intended to limit the invention to the form disclosed herein. Consequently, variations and modifications commensurate with: the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for facilitating the selection of a color from a color database for a product, comprising:

providing a digital communication network for communicating digital data between at least two locations;

first conveying, using said digital communication network, a request relating to the color database for the product, said request coming from a first location associated with a potential purchaser of the product and being directed to a second location that is capable of accessing the color database;

second conveying, using said digital communication network, a response to said request, said response coming from the second location and being directed to the first location.

2. The method as claimed in claim 1, wherein:

said first conveying includes conveying a target color description to be used in searching the color database for a product.

3. The method as claimed in claim 2, wherein:

said second conveying includes conveying a color from the color database for a product that is in a form that is displayable on a color output peripheral and is within a predetermined range of closeness to said target color.

4. The method as claimed in claim 2, wherein:

said second conveying includes conveying an indication of the closeness of a color in the color database for the product to said target color.

5. The method as claimed in claim 2, wherein:

said second conveying includes conveying a color identification number for a color from the color database for a product that is within a predetermined range of closeness to said target color.

6. The method as claimed in claim 2, wherein:

said second conveying includes conveying a virtual color table that is in a form that is displayable on a color output peripheral and includes said target color and at least one color from the color database for the product.

7. The method as claimed in claim 6, wherein:

said target color is a background color and the color from the color database for the product is a foreground color.

8. The method as claimed in claim 2, wherein:

said target color description is in one of the following formats: RGB and L*a*b*.

9. The method as claimed in claim 1, wherein:

said first conveying includes conveying an index color description for use in browsing the color database for the product.

10. The method as claimed in claim 9, wherein:

said second conveying includes conveying a color from the color database for a product that is in a form that is displayable on a color output peripheral and is within a predetermined range of closeness to said index color.

11. The method as claimed in claim 1, wherein:

said first conveying includes conveying a request that includes an order for a physical sample.

12. A method for facilitating the selection of a color from a color database for a product, comprising:

providing a digital communication network for communicating digital data between at least two locations;

first conveying, using said digital communication network, a request relating to a color library, said request coming from a first location associated with a potential purchaser and directed to a second location that is capable of accessing the color database;

processing, at said second location, said request to provide a response to said request;

second conveying, using said digital communication network, said response to said request, said response coming from the second location and directed to the first location.

13. The method as claimed in claim 12, wherein:

said digital communication network includes the World Wide Web.

14. The method as claimed in claim 12, wherein:

said first conveying includes conveying a three-dimensional target color description to be used in searching the color database for a product.

15. The method as claimed in claim 14, wherein:

said processing includes conducting a first search of a first three-dimensional space of the color database for colors that are close to said target color, said three-dimensional space defined by a predetermined first tolerance relative to each value of said three-dimensional target color.

16. The method as claimed in claim 15, wherein:

said processing includes conducting a second search of a second three-dimensional space of the color database if said first search identifies a different number of colors within said first three-dimensional space than a predetermined number.

17. The method as claimed in claim 16, wherein:

said second three-dimensional space defined by a second tolerance relative to each value of said three dimensional target color, said second tolerance having a binary relationship to said first tolerance.

18. A method for facilitating the selection of a color from a color database for a product, comprising:
providing a computer system that includes a color database for a product;
receiving, using said computer system, a request relating to said color database, said request having originated at a first location associated with a potential purchaser of the product;
processing, using said computer system, said request to produce a response to said request;
transmitting, using said computer system, said response towards said first location associated with the potential purchaser.

19. The method as claimed in claim 18, wherein:
said request includes a target color description to use in searching said color database.

20. The method as claimed in claim 19, wherein:
said processing includes searching said color database for colors that are within a predetermined range of said target color.

21. The method as claimed in claim 20, wherein:
said processing includes determining the closeness of each color within said predetermined range to said target color.

22. A method for enabling a customer to select a color from a color database for a product over a network, comprising:
providing the customer with access to the color database over the network;
receiving a request to search the color database for a specified target color from the customer;
in response to the customer request, finding a color in the color database that is within a predetermined range of closeness to the specified target color; and
providing the color in the color database that is within the predetermined range of closeness to the specified target color to the customer.

23. The method according to claim 22, wherein the request to search the color database for a specified target color comprises providing a description in a color identification format.

24. The method according to claim 23, wherein the color identification format comprise at least one of a RGB format and L*a*b* format.

25. The method according to claim 23, wherein the finding of a color in the color database comprises searching the color database according to the provided description.

26. The method according to claim 22, wherein the finding of a color in the color database comprises modifying the predetermined range of closeness if there are an unsatisfactory number of colors in the color database that conform to the predetermined range of closeness.

27. The method according to claim 26, further comprises searching the color database for a color that is within the modified predetermined range of closeness.

28. The method according to claim 22, wherein the providing of a color to the customer comprises providing a closeness value for a color that is within the predetermined range of closeness to the specified target color, wherein the closeness value is representative of the similarity between the color and the specified target color.

29. The method according to claim 22, wherein the providing of a color to the customer comprises providing a virtual color table that includes the specified target color and at least one color from the color database.

30. The method according to claim 29, wherein the virtual color table comprises a background region and a plurality of swatches overlying the background region.

31. The method according to claim 30, wherein the virtual color table displays the specified target color in the background region and the at least one color from the color database in at least one of the plurality of swatches.

32. The method according to claim 31, further comprising providing a closeness value for each of the plurality of swatches, wherein the closeness value is representative of the similarity between color display in each of the swatches with the specified target color.

33. The method according to claim 22, further comprising receiving a request to browse the color database for colors that are available for the product.

34. The method according to claim 33, further comprising in response to the customer request, finding the colors in the color database that are available for the product.

35. The method according to claim 34, further comprising providing a spectrum of the available colors to the customer.

36. The method according to claim 35, further comprising prompting the customer to order the product in at least one of the available colors.

37. The method according to claim 36, further comprising processing an order made by the customer.

38. The method according to claim 22, further comprising prompting the customer to order the product in the color provided thereto.

39. The method according to claim 38, further comprising processing an order made by the customer.

40. A method in a computer system for displaying a plurality of pages to enable a customer to select a color from a color database for a product over a network, comprising:
displaying a screen view for permitting the customer to access the color database over the network;
displaying a screen view for permitting the customer to input a request to search the color database for a specified target color; and
displaying a screen view for providing the color in the color database that is within a predetermined range of closeness to the specified target color to the customer.

41. The method according to claim 40, wherein the displaying of a screen view for permitting a request to search the color database for a specified target color comprises displaying a screen view for inputting a description in a color identification format.

42. The method according to claim 41, wherein the color identification format comprise at least one of a RGB format and L*a*b* format.

43. The method according to claim 40, wherein the displaying of a screen view for providing a color to the customer comprises providing a closeness value for a color that is within the predetermined range of closeness to the specified target color, wherein the closeness value is representative of the similarity between the color and the specified target color.

44. The method according to claim 40, wherein the displaying of a screen view for providing a color to the customer comprises displaying a screen view for providing a virtual color table that includes the specified target color and at least one color from the color database.

45. The method according to claim 44, wherein the virtual color table comprises a background region and a plurality of swatches overlying the background region.

46. The method according to claim 45, wherein the virtual color table displays the specified target color in the background region and the at least one color from the color database in at least one of the plurality of swatches.

47. The method according to claim 46, further comprising providing a closeness value for each of the plurality of swatches, wherein the closeness value is representative of the similarity between color display in each of the swatches with the specified target color.

48. The method according to claim 40, further comprising displaying a screen view for permitting the customer to input a request to browse the color database for colors that are available for the product.

49. The method according to claim 48, further comprising displaying a screen view for providing a spectrum of the available colors to the customer.

50. The method according to claim 49, further comprising displaying a screen view for prompting the customer to order the product in at least one of the available colors.

51. The method according to claim 40, further comprising displaying a screen view for prompting the customer to order the product in the color provided thereto.

* * * * *